(12) United States Patent
Backus et al.

(10) Patent No.: US 12,157,584 B2
(45) Date of Patent: Dec. 3, 2024

(54) PRECISION POINTING INTERFACE

(71) Applicant: California Institute of Technology, Pasadena, CA (US)

(72) Inventors: Spencer Backus, Pasadena, CA (US); Gregory S. Agnes, Pasadena, CA (US); Russell G. Smith, Pasadena, CA (US); Eric T. Sunada, Pasadena, CA (US); Blair J. Emanuel, Pasadena, CA (US); Rudranarayan M. Mukherjee, Pasadena, CA (US); Samantha H. Glassner, Pasadena, CA (US); Timothy P. Setterfield, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 468 days.

(21) Appl. No.: 17/731,071

(22) Filed: Apr. 27, 2022

(65) Prior Publication Data
US 2022/0348359 A1    Nov. 3, 2022

Related U.S. Application Data

(60) Provisional application No. 63/183,159, filed on May 3, 2021.

(51) Int. Cl.
*B64G 1/22*    (2006.01)
(52) U.S. Cl.
CPC .................... *B64G 1/228* (2023.08)
(58) Field of Classification Search
CPC ................ B64G 1/22; B64G 1/228
See application file for complete search history.

(56) References Cited

U.S. PATENT DOCUMENTS

| | | | | |
|---|---|---|---|---|
| 2013/0154170 A1* | 6/2013 | Davis | .................. | B64G 1/641 267/136 |
| 2013/0284857 A1* | 10/2013 | Tombe | .................. | B64G 1/641 244/173.2 |
| 2013/0299669 A1* | 11/2013 | Laurens | ................ | B64G 1/641 248/573 |
| 2014/0048240 A1* | 2/2014 | Platus | ................... | B64G 1/50 165/185 |
| 2016/0047433 A1* | 2/2016 | Bronowicki | .......... | F16M 11/40 248/562 |
| 2021/0356015 A1* | 11/2021 | Aston | .................... | F16F 15/08 |
| 2022/0282766 A1* | 9/2022 | Pu | ......................... | F16F 15/08 |

OTHER PUBLICATIONS

Agnes, G. S., et al., "Testing the deployment repeatability of a precision deployable boom prototype for the proposed SWOT Karin instrument," in Proceedings of the 2nd AIAA Spacecraft Structures Conference, Kissimmee, Florida, 2015. 13 Pages.

(Continued)

*Primary Examiner* — Justin M Benedik
(74) *Attorney, Agent, or Firm* — Steinfl + Bruno LLP (57) ABSTRACT

Pointing interfaces that can be used to assemble/disassemble instruments/payloads from a spacecraft/host are disclosed. The disclosed interfaces provide structural, communications, power, and fluid connections (for thermal control). Such interfaces also provide active and passive vibration isolation capability for precision pointing. They can further act as an interface to the launch vehicle for secondary delivery of the instrument/payload to the spacecraft.

16 Claims, 8 Drawing Sheets

(56) References Cited

OTHER PUBLICATIONS

Backes, P. G., "Generalized compliant motion with sensor fusion," in *Fifth International Conference on Advanced Robotics 'Robots in Unstructured Environments*, Jun. 1991, pp. 1281-1286 vol. 2. 7 Pages.

Backes, P., "The intelligent robotics system architecture applied to robotics testbeds and research plat- forms." in *2018 IEEE Aerospace Conference*, Mar. 2018, pp. 1-8. 9 Pages.

Basilio, R., et al., "Systems design and implementation of the proposed orbiting carbon observatory-3 on the international space station's Japanese experimental module," *Science and Technology Series*, vol. 114, No. 20130000, 2013. pp. 321-323, 5 Pages.

Beeson, P., et al., "TRAC-IK: An open-source library for improved solving of generic inverse kinematics," *in Proceedings of the IEEE RAS Humanoids Conference*, Seoul, Korea, Nov. 2015. 9 Pages.

Callen, P., "Robotic transfer and interfaces for external ISS payloads," *3rd Annual ISS Research and Development Conference*, Jun. 2014. 35 Pages.

Cook, J., et al., "ISS interface mechanisms and their lineage," 2011, 60 Pages. Accessible online from https://ntrs.nasa.gov/archive/nasa/casi.ntrs.nasa.gov/20110010964.pdf.

Cruijssen, H., et al., "The European robotic arm: A high performance mechanism finally on its way to space," *The 42nd Aerospace Mechanism Symposium*, pp. 319-334, May 14-16, 2014. 17 Pages.

DragonLab Fast track to flight, SpaceX, https://www.spacex.com/sites/spacex/files/pdf/DragonLabFactSheet.pdf. 3 Pages. Jan. 2014.

Dulles, V., "Northrop Grumman's Cygnus SpacecraftSuccessfully Concludes Ninth Cargo SupplyMission to the International Space Station", Northrop Grumman, Jul. 30, 2018, 9 Pages.

"Eagle-S efficient and flexible rideshare spacecraft," Northrop Grumman Systems Corporation, 2013,http://www.northropgrumman.com/Capabilities/EagleSpacecraft/Documents/pageDocs/Eagle_S_datasheet.pdf. 3 Pages.

General Payload Users Guide, Spaceflight Inc., 3415 S. 116th St, Suite 123 Tuckwila, WA 98168, 2015, 49 Pages. http://www.spaceflight.com/wp-content/uploads/2015/05/SPUG-RevF.pdf.

Kawasaki, K., "Overview of JEM-EF on ISS," *Proceedings of the RIKEN Symposium*, pp. 1-3, 2008. 4 pages.

Laryssa, P., et al., "International Space Station robotics: A comparative study of ERA, JEMRMS and MSS," in 7th ESA Workshop on Advanced Space Technologies for Robotics and Automation 'ASTRA 2002'. ESA, Nov. 19-21, 2002. 19 Pages.

Mission Extension Vehicle (MEV) A Rendezvous Proximity Operation and Docking (RPOD) Bus For SpaceLogistics, Northrop Grumman, 2017. www.northropgrumman.com/capabilities/SpaceLogistics/Documents/MEV_Factsheet.pdf. 3 Pages.

Mukherjee, R., et al., "A Robotically Assembled and Serviced Science Station for Earth Observations," *2020 IEEE Aerospace Conference*, Mar. 2020. doi: 10.1109/AERO47225.2020.9172368. 16 Pages.

National Aeronautics and Space Administration, "In-space robotic manufacturing and assembly (IRMA)," Update for NAC TI & E Committee, Nov. 18, 2016, https://www.nasa.gov/missio_pages/tdm/irma/index.html. 20 Pages.

Neeck, S. P., et al., "The NASA Earth Science Flight Program: an update," in Sensors, Systems, and Next-Generation Satellites Xix, R. Meynart, S. P. Neeck, and H. Shimoda, Eds., vol. 9639, International Society for Optics and Photonics. SPIE, Oct. 12, 2015, pp. 45-59. 17 Pages.

Olson, E., "AprilTag : A robust and flexible visual fiducial system," in IEEE International Conference on Robotics and Automation, May 9-13, 2011, pp. 3400-3407. 9 Pages.

Parrish, J., "Robotic servicing of geosynchronous satellites (RSGS)," Accessed Oct. 11, 2018. Downloaded May 20, 2022. Accessible online Online from https://www.darpa.mil/program/robotic-servicing-of-geosynchronous-satellites.

Quigley, M., et al., "Ros: an open-source robot operating system," in *Proc. of the IEEE Intl. Conf. on Robotics and Automation (ICRA) Workshop on Open Source Robotics*, Kobe, Japan, May 2009. 7 Pages.

Restore-L Proving Satellite Servicing, National Aeronautics and Space Administration, 2016, 2 Pages. Accessible online from https://www.nasa.gov/sites/default/files/atoms/files/restore factsheet_092717.pdf.

"Sherpa TM Payload User Guide," Spaceflight, 2022, https://spaceflight.com/just-released-sherpa-payload-users-guide/. 36 Pages.

Stephens, G. L., et al., "The Cloud Sat mission and the A-Train," *Bulletin of the American Meteorological Society*, vol. 83, No. 12, pp. 1771-1790, 2002. 21 Pages.

"The orbital maneuvering vehicle," MOOG, 2019, Downloaded May 20, 2022. 6 Pages. https://www.moog.com/markets/space/omv.html.

\* cited by examiner

PRECISION POINTING INTERFACE

CROSS REFERENCE TO RELATED APPLICATIONS

The present application claims priority to U.S. Provisional Patent Application No. 63/183,159, filed on May 3, 2021 incorporated herein by reference in its entirety.

STATEMENT OF GOVERNMENT GRANT

This invention was made with government support under Grant No. 80NMO0018D0004 awarded by NASA (JPL). The government has certain rights in the invention.

FIELD

The present disclosure is related to precision pointing interfaces for robotically or manually assembling modular payloads and/or instruments onto spacecrafts or similar entities.

BACKGROUND

The overall architecture of a Science Station, a robotically assembled and serviced persistent platform that can host multiple payloads for Earth observations, is described in detail in the above-incorporated provisional application. The Science Station is conceptualized as a persistent platform for remote sensing with the ability to host multiple instruments that are robotically assembled onto the platform and periodically upgraded. The Science Station would be in a sun-synchronous polar orbit similar to the A-train. Architecturally, it is conceptualized as a spacecraft, similar in performance to commercially available GEO communication spacecraft, retrofitted with two trusses. The spacecraft would provide all needed resources i.e. structure, power, thermal control, communications, and attitude control among others. The trusses would have interfaces or ports for multiple nadir facing instruments that provide utilities such as power, communications, fluid loops for thermal control, and vibration isolation for precision pointing. The spacecraft would have an in-situ robotic system for instrument assembly and servicing. Some of the instruments could be launched on the first launch with the spacecraft and robotic system. The other instruments may be delivered by Cargo Delivery Vehicles (CDVs). The robotic system would berth the CDVs to the persistent platform, unload the instrument, carry it to the desired port and install it on the port. Similarly, the robot may also remove an existing instrument from the port and install it on the CDV for disposal. The port would then become available for a new instrument, thereby enabling periodic instrument upgrades. This would enable fast turnaround times for new instrument development and rapid response to scientific needs.

The attitude control system of the spacecraft of the Science Station is a source of disturbance. The solar array and radiators also introduce noise. The truss would transmit and potentially amplify these disturbances to the instrument ports or interfaces. One solution to mitigate the disturbance to instrument pointing may be to improve spacecraft attitude control system and other disturbance sources and use deeper or more stable trusses. The design of a higher accuracy deployable truss while possible, would be a costly endeavor. Similarly, improving the performance of the spacecraft disturbance sources would also be an expensive endeavor requiring significant development. Another solution to overcome the above-mentioned disturbances is to use a centralized metrology system and correct for instrument interface disturbance, A centralized metrology system, such as fiducial sets with cameras, a laser truss, linking the individual instruments to the main spacecraft body could be used to correct for the deformations of the truss on orbit. This would, however, be a new development, have cost impacts, and could face line-of-sight issues due to the overall configuration of the Science Station.

SUMMARY

The disclosed methods and devices address the above issue, by implementing a localized metrology and correction system for maintaining the instrument pointing. With the rapid growth in CubeSats and SmallSats, compact, low-cost star trackers have emerged as standardized items. The performance of existing star trackers may be sufficient for pointing requirements. The disclosed precision pointing interfaces comprise a built-in star tracker and a combination of active-passive disturbance rejection system. Such disturbance rejection system would close the loop with the star tracker to take out the disturbances from the spacecraft and truss. In what follows structural details of the precision pointing interface and the active-passive disturbance rejection system (also called vibration isolation system throughout the disclosure) implemented as part of the such interface are disclosed.

According to a first aspect of the disclosure, a pointing interface is provided, the pointing interface comprising: a first plate being connectable to a host; a second plate and an instrument plate, the instrument plate being connectable to an instrument; and a plurality of vibration isolation systems connecting the second plate to the instrument plate, wherein: each vibration system of the plurality of vibration isolation systems comprises a series configuration of a spring-damper system configured to reduce high frequency disturbances from the host and an actuator configured to reduce low frequency disturbances from the host.

Further aspects of the disclosure are provided in the description, drawings and claims of the present application.

DETAILED DESCRIPTION

The disclosed pointing interface provides structural connection between the payload/instrument and the spacecraft. It also provides electric connection for power and communications, and fluidic connection for thermal control purposes. Further, the interface also has the ability to precisely point the payload/instrument while rejecting the disturbance from the spacecraft. The disturbance is usually described as vibrations of various frequencies such as slow vibrations arising from thermal changes and fast vibrations arising from spacecraft elements such as attitude control gyroscopes.

According to the teachings of the present disclosure, during in-space operations, the interface may be used by a robot (or astronaut) to assemble or disassemble a payload or instrument from the host spacecraft. The interface can also be used to deliver the payload/instrument to the host spacecraft using a secondary spacecraft that is launched after the host spacecraft.

Figure 1A:
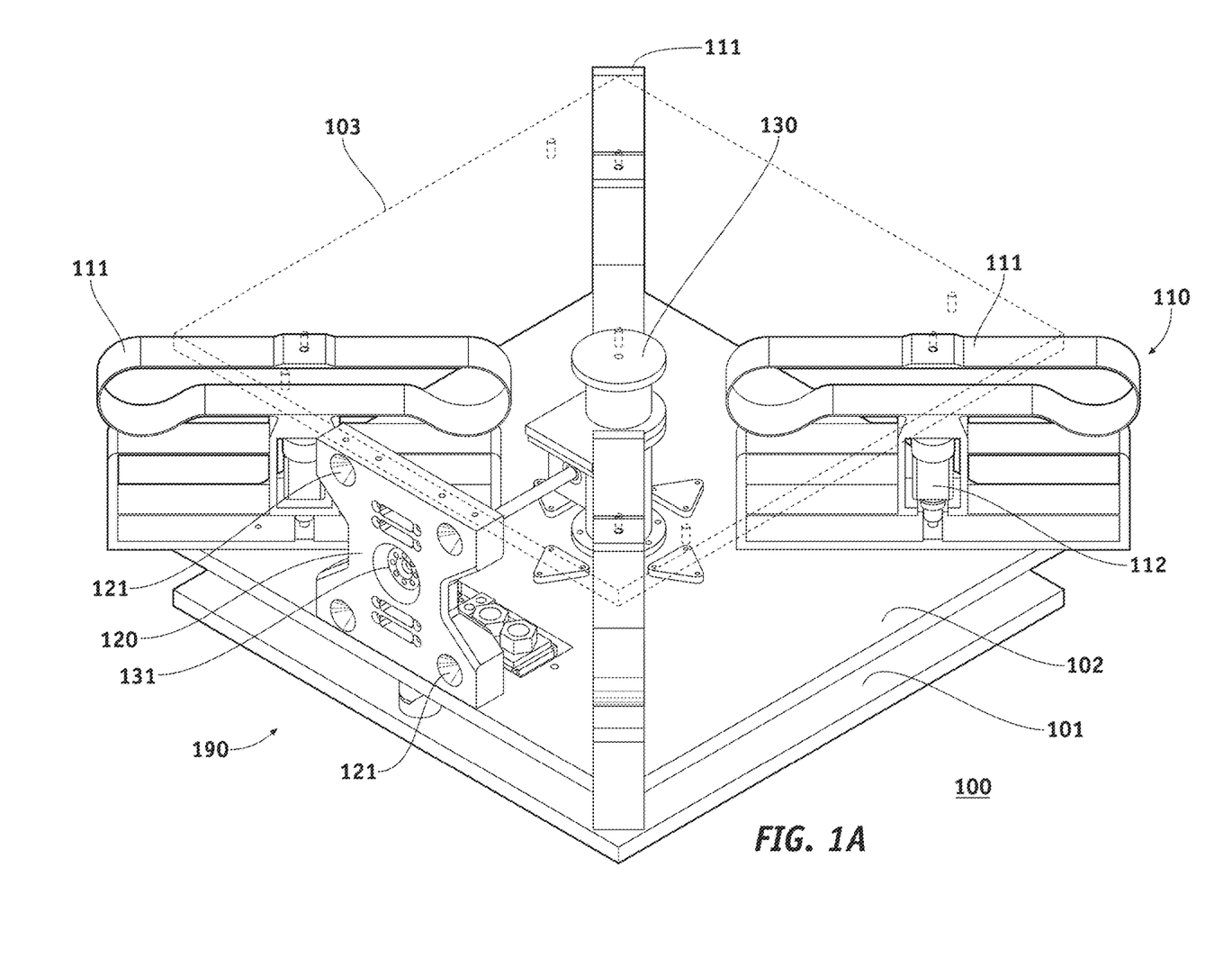
FIG. 1A shows an exemplary precision pointing system according to an embodiment of the present disclosure.

FIG. 1A shows an exemplary precision pointing interface (100) according to an embodiment of the present disclosure. Pointing interface (100) comprises instrument plate (103), instrument-side plate (102) and host-side plate (101). Instrument plate (103) and instrument-side plate (102) are connected via a plurality of vibration isolation systems (110), each including a series combination of a passive spring-damper system (111) and an optional active element comprising an actuator (112). In an embodiment, four vibration isolation systems (110) can be used, although different numbers of such systems may also be envisaged. Vibration isolation systems (110) have the function of rejecting and reducing the existing disturbances as described previously. In other words, the spring-damper systems (111) are tuned to reject higher frequency jitter. The pointing requirements of a certain class of payloads and instruments can be addressed by the disturbance rejected through the spring-damper system (111). However, for others with more stringent requirements, actuators (112) are actively controlled to reject low frequency disturbances and improve pointing accuracy.

Figure 1B:
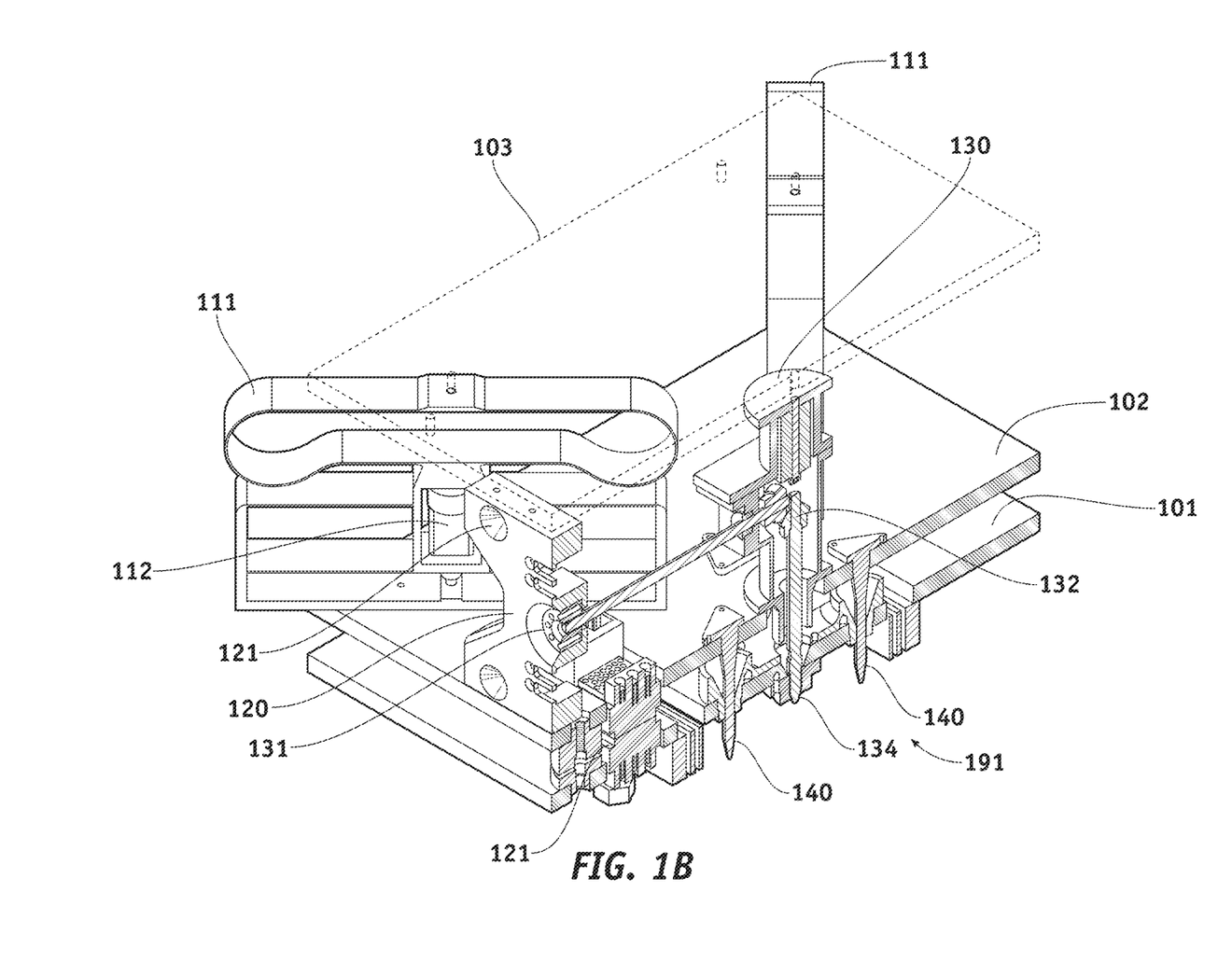
FIG. 1B shows a cross-sectional view of the embodiment of FIG. 1A.
Figure 1C:
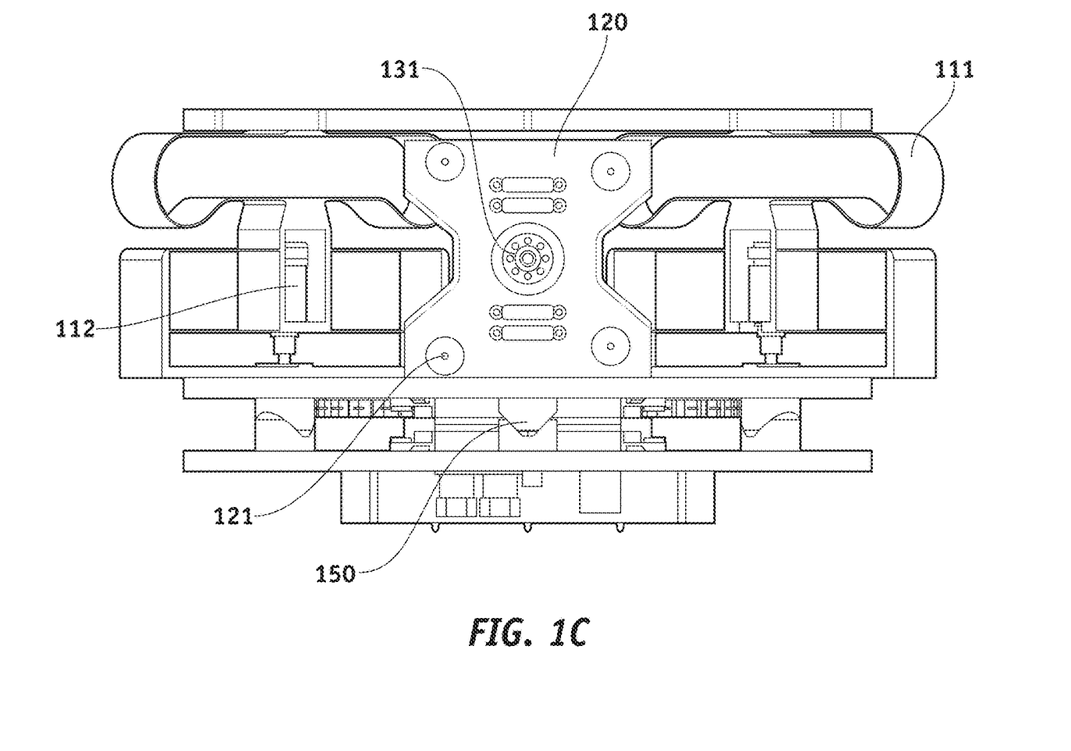
FIG. 1C shows a side-view, of the embodiment of FIG. 1A.
Figure 1D:
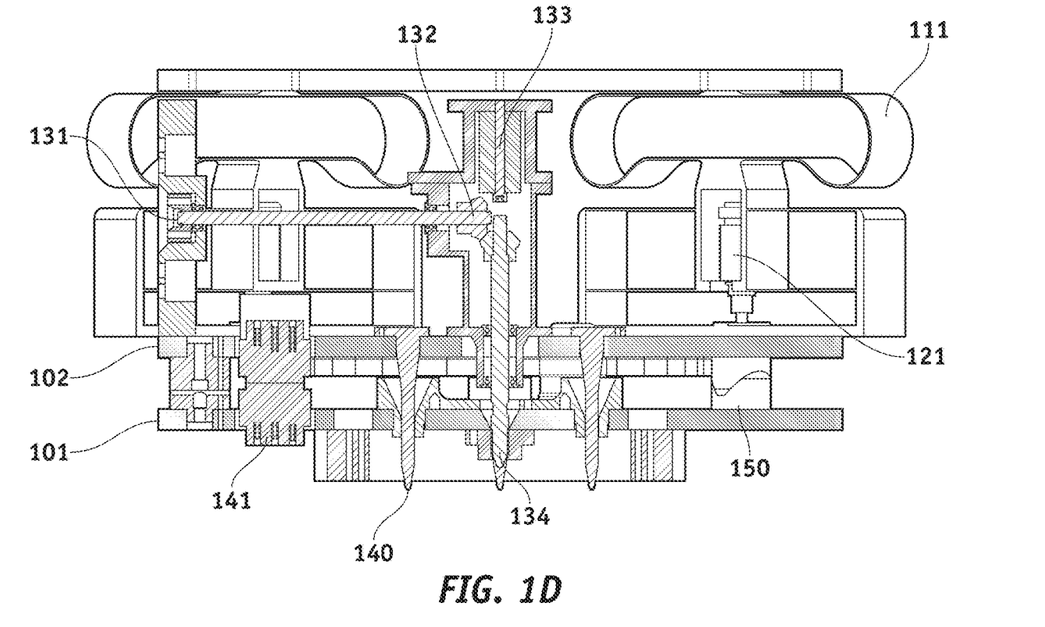
FIG. 1D shows aside-view, of the embodiment of FIG. 1B.
Figure 1E:
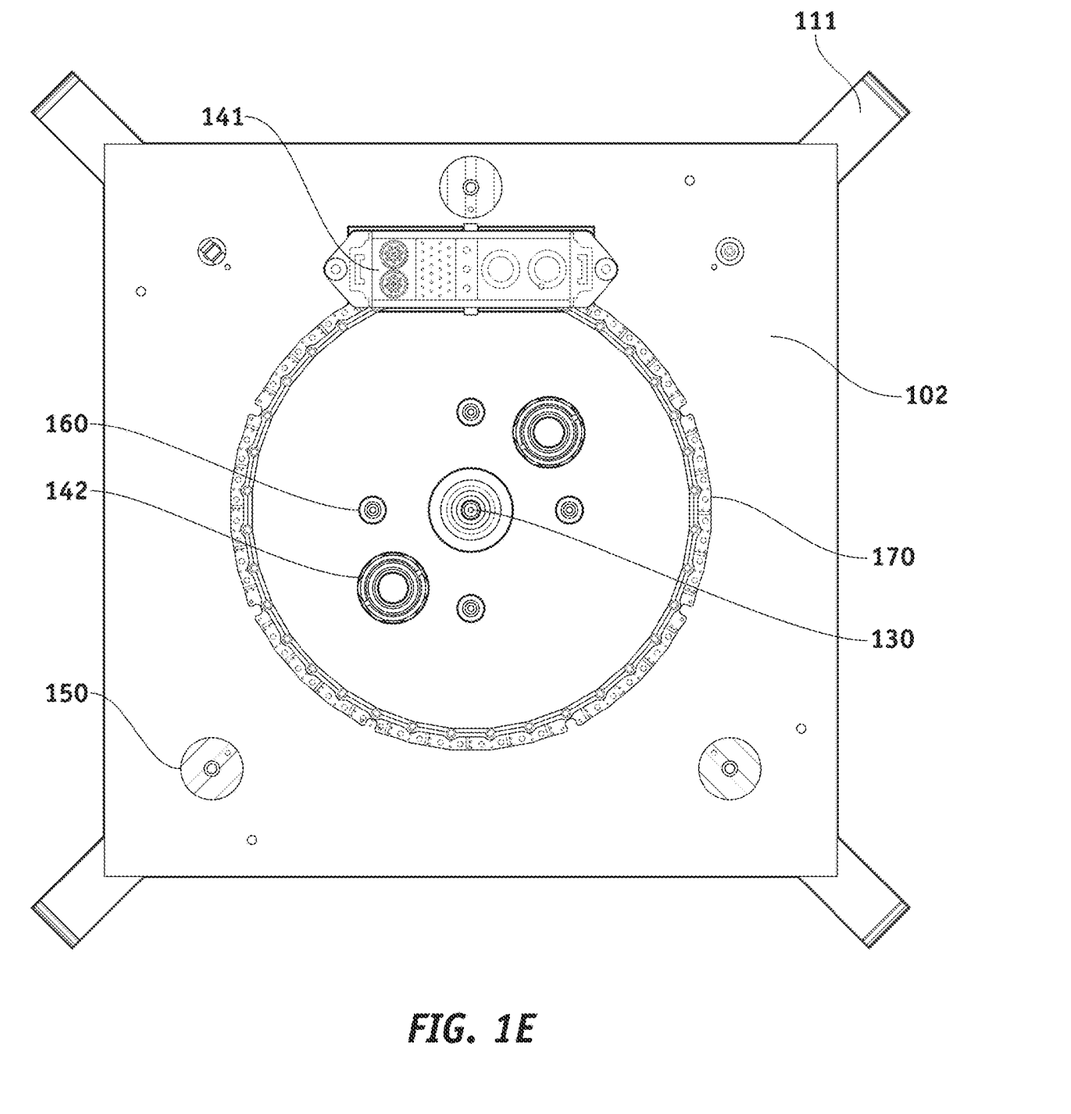
FIG. 1E shows the bottom view of instrument-side plate of FIG. 1A.
Figure 1F:
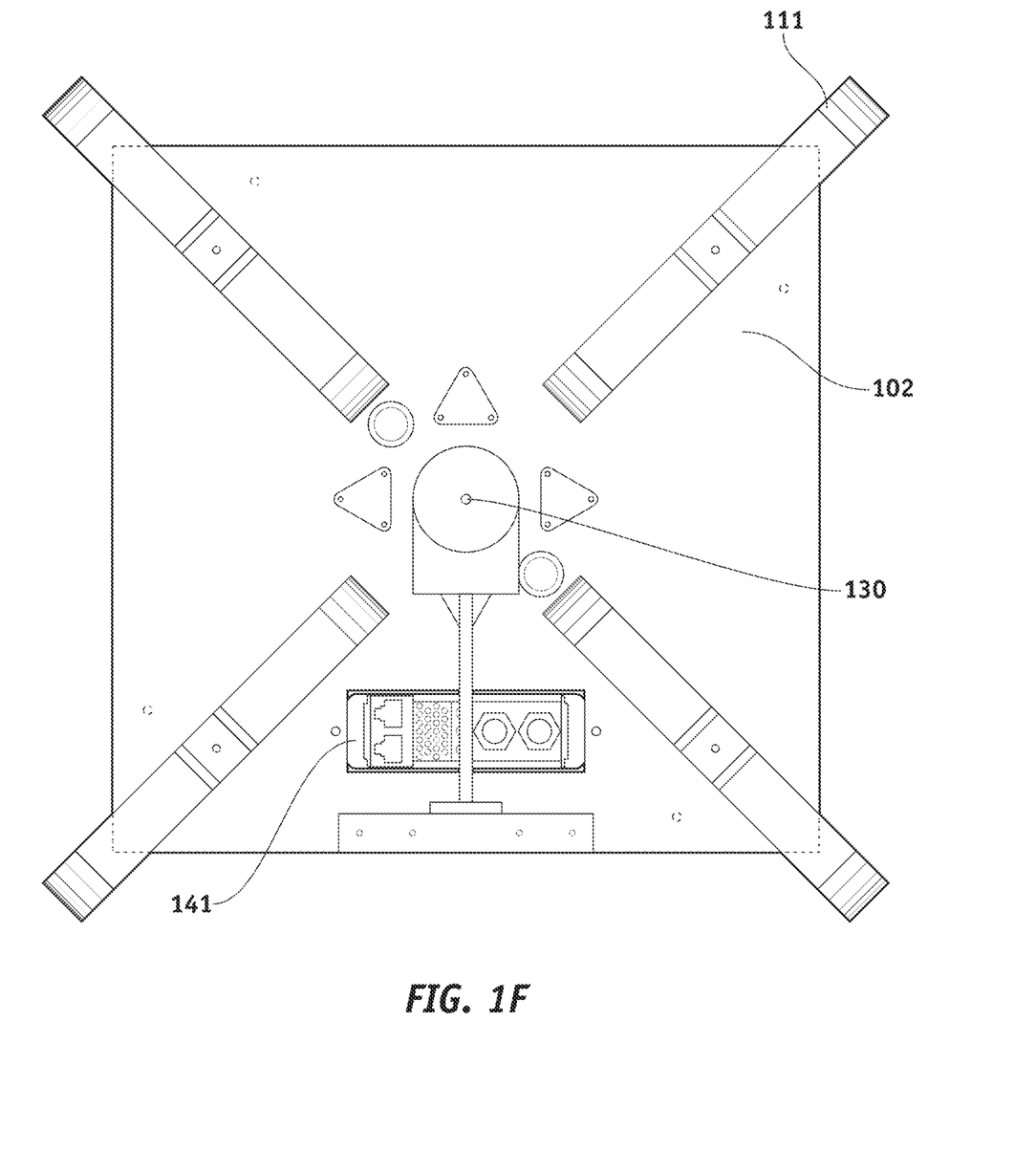
FIG. 1F shows the top view of instrument-side plate of FIG. 1A.
Figure 1G:
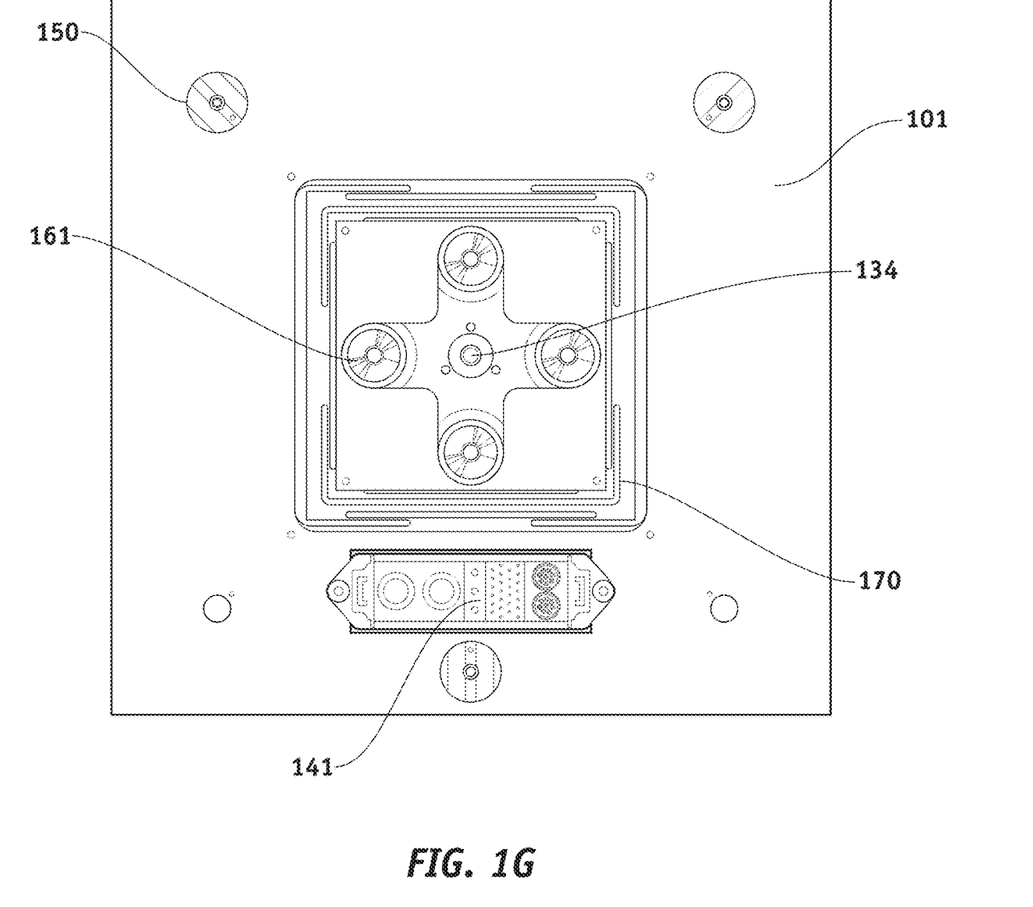
FIG. 1G shows the bottom view of the host-side plate of FIG. 1A.

FIG. 1B shows a cross-sectional view of the embodiment of FIG. 1A. FIG. 1C shows a side view, as indicated by arrow (190) of FIG. 1A, of the embodiment of FIG. 1A. FIG. 1D shows a side view, as indicated by arrow (191) of FIG. 1B, of the embodiment of FIG. 1B. FIG. 1E shows the bottom view of instrument-side plate (102) of FIG. 1A, and FIG. 1F shows the top view of instrument-side plate (102) of FIG. 1A. FIG. 1G shows the bottom view of the host-side plate (101) of FIG. 1A.

Referring to FIGS. 1A-1C, the instrument side has a grapple interface (120). In robotic operations, such interface enables a robot to grapple the pointing interface (100). The grapple interface (120) includes electrical and communication connectors (not shown) that mate with their corresponding halves on the robot end effector (not shown). This enables the payload/instrument to draw survival power through the robot as well as communication. The grapple interface (120) may further include cone and pin alignment features (121) as well as fiducials (not shown) for vision-based localization for the robot to grasp the interface.

Referring to FIGS. 1A-1B, during operation, instrument-side plate (102) and host-side plate (101) may be locked to each other through a Z-lock (130). The host side may implement a commercially available ZipNut® for structural connections and a mating screw is on the payload side. This is a beneficial approach to threaded connections that allows the user to simply slide the ZipNut® down the screw and with a quick turn, have a secure connection without worrying about cross-threading or damaged studs. Z-lock (130) further includes a geared drive mechanism (132) for rotating the screw to get a secure connection. Referring to FIGS. 1A-1C, the grapple interface (120) further includes a hexagonal bolt head (131) that can turn the screw for structural connection of the instrument-side and host-side plates (102, 102). The bolt head (131) can be actuated by a nut driver on the robot arm's end effector (not shown). According to the teachings of the present disclosure, pointing interface (100) allows a robot to align, assemble, and secure a payload using only one arm and without having to let go of the payload. It also does not need an additional powered actuator for securing the two halves as the robot provides the motive power. When not used in robotic application, this drive may either be manually actuated or using a motorized system.

As can be seen in FIGS. 1C-1D, and FIG. 1G, each of the instrument-side and host-side plates (102, 101) plates has two mating halves of a plurality of sets of kinematic mounts (150). In a preferred embodiment, three sets of kinematic mounts may be implemented. These kinematic mounts (150) enable precision assembly of the two plates (101, 102) in order to achieve, for example, an order of 10 micron precision. Kinematic mounts (150) ensure planar connection between the two plates (101, 102). With reference to FIG. 1G, a planar flexure (170) decouples kinematic mount points from all other elements in the interface, assuring that the mount remains truly kinematic with six points of contact (e.g. in the case where three kinematic mounts are implemented). Referring to FIGS. 1E-1G, modular connector (141) may be implemented for electrical, fluids and communications contacts. Also shown in FIG. 1E is a delivery vehicle interconnect (170) connecting the instrument-side plate (102) to the delivery vehicle during launch.

With reference to FIGS. 1E, and 1G, instrument-side and host-side plates (102, 101) may implement alignment features in the form of pins and cones. The alignment cones (161) are used to guide the alignment pins (160) into alignment. These alignment features are mounted such that the two instrument-side and host-side plates (102, 103) can be assembled only one way. The cones are on the host side while the pins are on the payload side. The use of guide pins and cones makes the interface to achieve desired performance despite starting with large initial translational and rotational errors in alignment. These alignment features assist in precision assembly of the two sides of the interface when used in conjunction with force or compliance control of the robotic arm. In some embodiments, the instrument-side and the host-side plates (102, 103) may implement fiducials for vision-based localization.

Figure 2:
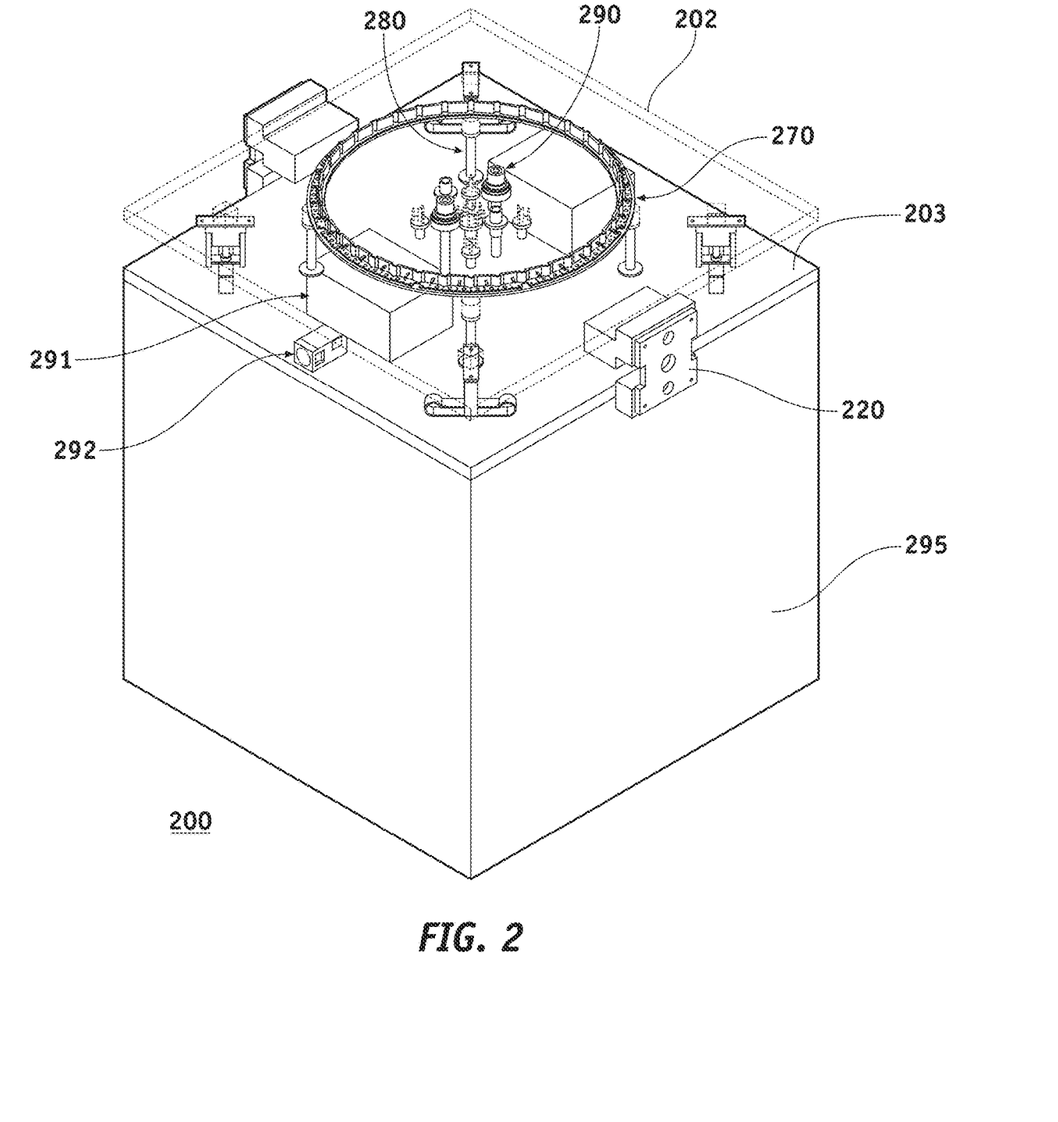
FIG. 2 shows an arrangement including a pointing system according to an embodiment of the present disclosure.

FIG. 2 shows an arrangement (200) showing instrument (295) being attached to a pointing system, the instrument-side of which is only shown to avoid overwhelming the figure. Elements such as instrument plate (203), instrument-side plate (202), grapple interface (220) and delivery interconnect (270) are also shown. The functionalities of such elements are similar to what was described with regards to their respective counterparts of FIGS. 1A-1G. Arrangement (200) further includes star tracker (292). During operations, such tracker provides precise pointing knowledge of the instrument that is provided to the vibration isolation system and the instrument. Further shown in FIG. 2 are launch locks (280) connecting firmly the instrument to the pointing interface during launch.

With reference to FIGS. 1A-1D, similar to the embodiment of FIG. 2, the instrument plate (103) may include one or more star trackers (not shown). The actuators (112) work in tandem with the star trackers and on-board state estimation algorithms. The payload side hosts the required avionics for actuators (112) and star trackers as well as onboard compute and control unit that runs the on-board state estimation and control schemes for active precision pointing. The onboard compute and control unit uses the star trackers to calculate the attitude error of the payload or instrument relative to a designated star and then uses the actuators (112) in tandem to correct the error.

As an example, the disclosed pointing systems can accommodate instrument of 1 m×1 m dimensions. With reference to FIGS. 1A-1G, according to the teachings of the present disclosure, electrical and thermal utilities are also passed from the host side of the interface through the vibration isolation system to the instrument/payload attached to interface with low stiffness service loops that minimize the transmission of vibrations from the host side of the interface (i.e., from the spacecraft) to the payload side of the interface. The payload side of the disclosed pointing interfaces is also used to integrate the payload or instrument to the launch vehicle.

The disclosed pointing systems represent a unified solution to (a) interfacing the instrument/payload to the delivery spacecraft that carries the instrument/payload to a host spacecraft, (b) connecting the payload/instrument to the host spacecraft and (c) providing precision pointing capability to the payload/instrument by rejecting the disturbances from the host spacecraft. This can be used for both robotic and human operations.

The invention claimed is:

1. A pointing interface comprising:
a first plate being connectable to a host;
a second plate and an instrument plate, the instrument plate being connectable to an instrument; and
a plurality of vibration isolation systems connecting the second plate to the instrument plate,
wherein:
each vibration system of the plurality of vibration isolation systems comprises a series configuration of a spring-damper system configured to reduce high frequency disturbances from the host and an actuator configured to reduce low frequency disturbances from the host.

2. The pointing interface of claim 1, further comprising a grapple interface between the second plate and the instrument plate, wherein in robotic operations, the grapple interface is configured to enable a robot to grapple the pointing interface.

3. The pointing interface of claim 2, wherein the grapple interface comprises electrical and communication connectors mating corresponding halves on an end effector of the robot.

4. The pointing interface of claim 2, wherein the grapple interface further comprises cone and pin alignment features to guide the robot to grasp the pointing interface.

5. The pointing interface of claim 3, further comprising a nut, a geared drive mechanism and a mating screw for a structural connection of the first plate and the second plate.

6. The pointing interface of claim 5, wherein the grapple interface further comprises a bolt head to turn, via the geared drive mechanism, the screw for the structural connection of the first plate and the second plate.

7. The pointing interface of claim 1, wherein the first plate and the second plate comprise mating halves of a plurality of sets of kinematic mounts for a planar connection between the first plate and the second plate.

8. The pointing interface of claim 7, wherein the plurality of set kinematic mounts comprise three sets of kinematic mounts.

9. The pointing interface of claim 1, wherein the first plate and the second plate comprise modular connectors for electrical, fluids and communications contacts.

10. The pointing interface of claim 1, wherein the second plate comprises a delivery vehicle interconnect connecting the second plate a delivery vehicle during a launch.

11. The pointing interface of claim 1, wherein:
the second plate comprises a plurality of alignment pins, and
the first plate comprises a plurality of alignment cons to guide the plurality of alignment pins into alignment for a precision assembly of the first plate and the second plate.

12. The pointing interface of claim 11, wherein the first plate and the second plate comprise fiducials for a vision-based localization.

13. The pointing interface of claim 1, further comprising a start tracker configured to calculate and provide an attitude error of or instrument relative to a designated star to the plurality of vibration isolation systems.

14. The pointing interface of claim 1, wherein the first plate and the second plate are of 1 m×1 m dimensions.

15. The pointing interface of claim 1, wherein the plurality of vibration isolation systems comprises four vibration isolation systems.

16. The pointing interface of claim 1, wherein the host is a spacecraft-located host.

* * * * *